US008967119B2

(12) United States Patent
Wey

(10) Patent No.: US 8,967,119 B2
(45) Date of Patent: *Mar. 3, 2015

(54) INFRARED-EMITTING CERAMICS FOR FUEL ACTIVATION

(76) Inventor: Albert Chin-Tang Wey, Westmont, IL (US)

( * ) Notice: Subject to any disclaimer, the term of this patent is extended or adjusted under 35 U.S.C. 154(b) by 1076 days.

This patent is subject to a terminal disclaimer.

(21) Appl. No.: 12/657,961

(22) Filed: Jan. 29, 2010

(65) Prior Publication Data

US 2011/0186010 A1 Aug. 4, 2011

(51) Int. Cl.
F02M 69/04 (2006.01)
F02B 51/06 (2006.01)
F02M 27/06 (2006.01)
F02M 27/00 (2006.01)

(52) U.S. Cl.
CPC ............... *F02B 51/06* (2013.01); *F02M 27/06* (2013.01); *Y02T 10/126* (2013.01)
USPC .......................................... 123/445; 123/538

(58) Field of Classification Search
USPC ............. 44/301; 123/445, 536–538; 252/582; 422/186
See application file for complete search history.

(56) References Cited

U.S. PATENT DOCUMENTS

| 6,026,788 | A | 2/2000 | Wey |
| 6,082,339 | A | 7/2000 | Wey |
| 7,021,297 | B1 | 4/2006 | Slingo |
| 7,036,492 | B2 | 5/2006 | Yoshimoto |
| 7,281,526 | B2 * | 10/2007 | Keiichiro et al. ............. 123/538 |
| 7,406,956 | B2 | 8/2008 | Fujii |
| 7,617,815 | B2 | 11/2009 | Wey |
| 2006/0011176 | A1 * | 1/2006 | Wey .............................. 123/538 |
| 2006/0147767 | A1 * | 7/2006 | Grieve et al. .................... 429/19 |

FOREIGN PATENT DOCUMENTS

CN 101045628 * 10/2007 ............. C04B 35/16
WO 2009009941 A1 1/2009

OTHER PUBLICATIONS

Korean Intellectual Property Office (International Search Authority), International Search Report and Written Opinion, PCT/US2011/021998, Aug. 9, 2011.

* cited by examiner

*Primary Examiner* — Bijan Ahvazi
(74) *Attorney, Agent, or Firm* — IpHorgan Ltd.

(57) ABSTRACT

This invention relates to a ceramic composite that comprises of a mixture of infrared-emitting metal oxides having specific spectral luminance in 3-20 μm (micrometers) wavelength range and an effective amount of pyroelectric material that helps enhance infrared emissions of said oxides in said wavelength range. Said ceramic composite can be deviced to provide an effective means of improving hydrocarbon fuel efficiency in internal combustion engines for better engine performance with increased torque and power, improved fuel economy, and reduced exhaust emissions. Such ceramic composites can also be used in other applications that utilize infrared emissions in said wavelength range.

10 Claims, 2 Drawing Sheets

INFRARED-EMITTING CERAMICS FOR FUEL ACTIVATION

BACKGROUND

1. Field of Invention

This invention relates to a ceramic composite, comprising a mixture of infrared-emitting oxides having specific spectral luminance in 3-20 micrometers wavelength range and an effective amount of pyroelectric material that helps enhance infrared emissions of said oxides in said wavelength range, that provides an effective means of improving hydrocarbon fuel efficiency in internal combustion engines for better engine performance with increased torque and power, improved fuel economy, and reduced exhaust emissions. Such ceramics can also be used in other applications that utilize infrared emissions in said wavelength range.

2. Description of Prior Art

According to Organic Chemistry photoexciting hydrocarbons with infrared photons shorter than 20 μm (micrometers) in wavelengths for improving fuel conversion efficiency is scientifically possible and has been proven by the present inventor in laboratory studies.

After years of research the present inventor discovered the use of infrared radiation at 3-14 μm wavelengths, defined as "mid-infrared" by U.S. NASA but "far infrared" in Japanese convention, for enhancing combustion efficiency of hydrocarbon fuel in internal combustion engines and resulted in the inventions of fuel combustion enhancement devices as disclosed in U.S. Pat. Nos. 6,026,788, 6,082,339 and 7,617,815.

These inventions are based on known science. It is recognized in Organic Chemistry that hydrocarbons are infrared-active and absorb multiphotons in 3-20 μm wavelengths causing molecular vibrations. In Photochemistry, enhancement of reaction rates by reactant vibrational excitation had been demonstrated in laboratory dynamics studies. The present inventor has proven the underlining science of infrared-fuel effect in a laminar non-premixed counterflow methane-air flame experimentation to help pinpoint the IR-excitation influences on combustion of hydrocarbon fuels. The present inventor further verified in engine tests that increasing infrared exposure in said wavelengths results in better engine performance.

Though the device as described in the U.S. Pat. Nos. 6,026,788 and 7,617,815 by the present inventor worked adequately for both light duty gasoline and diesel engines, the fuel activation effect became limited in the applications with heavy duty diesel engines, such as in tractors, earth moving equipment, marine vessels, locomotives, or power generators. These applications require irradiating an extensive flow of fuel substance in a very short time interval. It is because of the fact that only a small portion of the fuel substance is used in combustion for generating power, while the majority is utilized as lubricant and coolant in the turbo-pump system for fuel injection. Therefore, an innovative ceramic material with significantly amplified infrared emissions would be required for such applications.

Accordingly, the present inventor started searching issued patents and publications in this field for ideas, including U.S. Pat. Nos. 7,021,297, 7,036,492, 7,281,526, and 7,406,956, just to name a few. However, the present inventor found that the prior art failed to expressly or implicatively teach the way of making such an infrared-emitting ceramic with amplified luminance in said wavelength range. Therefore, the present inventor had to launch his own research and came up with the present invention.

After three years of intensive research, the present inventor successfully developed a ceramic composite that requires mixing various transition metal oxides, such as zirconia, titanium oxides, cobalt oxides, and others, as disclosed in U.S. Pat. Nos. 6,026,788 and 7,617,815 by the present inventor, with an effective amount of pyroelectric material in order to amplify the characteristic spectral luminance of the resultant ceramic composite. The processes also involve mixing, grinding, adding catalyst to the solution, dehydrating, green state forming, settling, pressing, molding, sintering, and room temperature resting.

Transition metal oxides with electrons occupying outer orbits $[nd]^{1-9} [(n+1)s]^{0-2}$ have such a unique property that the electrons can be thermally agitated to vibrate, moving between "bonding" (donation of electrons from transition metals) and "back-bonding" (back-donation of electrons to transition metals). The difference in energy levels is about 0.1-0.3 eV, which corresponds to photon emissions in 3-20 μm wavelengths as governed by the following formula: $E (eV) = 1.2398/\lambda\ (\mu m)$.

On the other hand, pyroelectric materials have an ability to generate a temporary electrical potential when they are heated or cooled. The change in temperature can slightly modify the positions of atoms within the crystal structure so that the polarization of the material may change. The polarization change gives rise to a temporary potential, although this disappears after the dielectric relaxation time. Nevertheless, this slight polarization change in crystal structure enables the orbital electrons in said transition metal oxides to jump between orbits more easily and frequently. Thus, adding pyroelectric material to the mixture of infrared-emitting oxides helps the resultant ceramic composite capture ambient temperature change and use it to significantly improve infrared emissions.

According to the present inventor's study, there are ten polar crystal structures that posses a temperature-dependent spontaneous polarization and exhibit pyroelectricity, which are sometimes referred as the pyroelectric classes. These crystal structures are 1, 2, m, mm2, 3, 3m, 4, 4 mm, 6, 6 mm, by their International Hermann-Mauquin notation.

The present inventor has developed prototype ceramic composites by purposely adding various amount of pyroelectric material, about 5-40% by weight, to a mixture of selected infrared-emitting metal oxides. The composite was then sintered at a temperature above 1200° C. The present inventor further discovered experimentally that adding an optimal amount of about 15-25% pyroelectric material would significantly increase the fuel activation effect and thus dramatically improve engine performance.

As described above, the prior art failed to teach the use of a mixture of selected infrared-emitting metal oxides having a specific spectral luminance in 3-20 μm wavelengths and an effective amount of pyroelectric material for boosting infrared emissions in said wavelength range and thus maximizing hydrocarbon fuel combustion efficiency in engines.

OBJECTS AND ADVANTAGES

Accordingly, one object of this invention is to provide a ceramic composite that has amplified infrared emissions in 3-20 μm wavelength range;

Another object of the present invention is to provide a device for effectively increasing combustion efficiency of hydrocarbon fuel in internal combustion engine to enhance its performance for increased power, improved fuel economy, and reduced tailpipe emissions;

Also, an object of the present invention is to provide a simple, easy-to-use, and maintenance-free fuel combustion efficiency enhancement device.

These objectives are achieved by a device based on a ceramic composite comprising essentially a mixture of selected infrared-emitting metal oxides and an effective amount of pyrpelectric material. The ceramic composite can be disposed either on exterior or in interior of an accessory of the fuel systems of an engine so that the hydrocarbon fuel flowing through said accessory may be excited by infrared from said composite for improved combustion efficiency. Said accessory may be fuel tank, pump, line, filter, injector, and the like.

Other objects, features, and advantages of the present invention will hereinafter become apparent to those skilled in the art from the following description.

DRAWING FIGURES

FIG. 3 shows a perspective view of another embodiment of the present invention with the ceramic composites being disposed in the interior of an accessory of the fuel systems of an engine, which may be fuel tanks, pumps, lines, filters, injectors, or the like.

REFERENCE NUMERALS IN DRAWINGS

Figure 1:
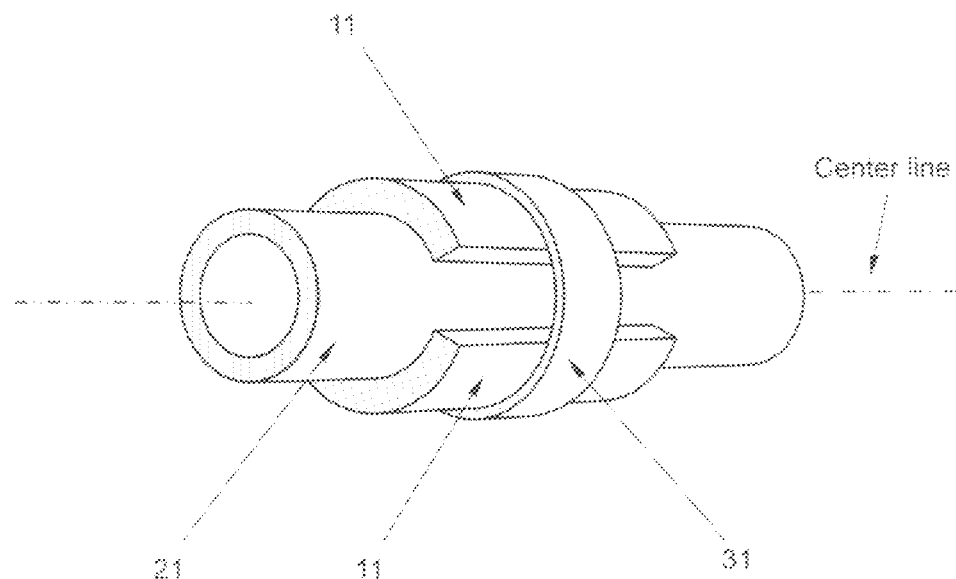
FIG. 1 shows a perspective view of one embodiment of the present invention with the ceramic composites in partial-tubular form being mounted on a fuel line.

| 11 | Infrared-emitting ceramic composite | 21 | Fuel line |
| 22 | Accessory of Engine Fuel systems | 31 | Attachment means |

SUMMARY

In accordance with the present invention a ceramic composite comprises of a mixture of infrared-emitting metal oxides having specific spectral luminance in 3-20 μm wavelength range and an effective amount of pyroelectric material that helps enhance infrared emissions of said oxides in said wavelength range. Said ceramic composite provides an effective means of improving hydrocarbon fuel efficiency in internal combustion engines for better engine performance with increased torque and power, improved fuel economy, and reduced exhaust emissions. Such ceramic composites can also be used in other applications that utilize infrared emissions in said wavelength range.

DETAILED DESCRIPTION OF THE INVENTION

The present inventor had invented the fuel activation devices (U.S. Pat. Nos. 6,026,788, 6,082,339 & 7,617,815) using infrared emissions in 3-14 μm wavelength range to excite hydrocarbon fuels and reported favorable results on improving engine performance with such devices. Moreover, since some applications with heavy-duty diesel engines require massive infrared exposure to the fuel, the present inventor experimentally found that adding an effective amount of pyroelectric material to the infrared-emitting metal oxides composition that was disclosed in aforementioned patents would significantly increase the infrared emissions for the purposed applications.

As stated before, there are ten polar crystal structures that posses a temperature-dependent spontaneous polarization and exhibit pyroelectricity. These crystals are referred as the pyroelectric classes, which include 1, 2, m, mm2, 3, 3m, 4, 4 mm, 6, 6 mm, by their International Hermann-Mauquin notation. They are, but not limited to, Halotrichite (2), Jarosite (3), and Alunite (3m) from complex sulfate system; Hemimorphite (mm2), Bertrandite (mm2), Schorl (3m), Cerite (3m), and Cancrinite (6) from silicate system; and Nepheline (6) from silica system. Their International Hermann-Mauquin notation is provided in parenthesis. It is worthwhile noting hereby that Schorl (3m) is the most common species of tourmaline and may account for 95% of all tourmaline in nature.

The ceramic composite of the present invention can be engineered as follows: First, prepare a mixture of powders of infrared-emitting metal oxides selected from the oxide groups as disclosed in the U.S. Pat. Nos. 6,026,788 and 7,617, 815 by the present inventor in theoretical percentages by weight for the intended peak wavelengths and spectral luminance. Then, add an effective amount of pyroelectric material to the oxides mixture. The pyroelectric material may be about 5-40% by weight, while 15-25% would lead to optimal results. Lastly, the mixture of metal oxides and pyroelectric material, along with bonding agent, catalysts, and stabilizers, will be press-molded to the desired shapes and sintered in a furnace at a preferred temperature 1200° C. or above. Several examples of the present invention were prepared accordingly for concept-demonstrating experiments.

Figure 2:
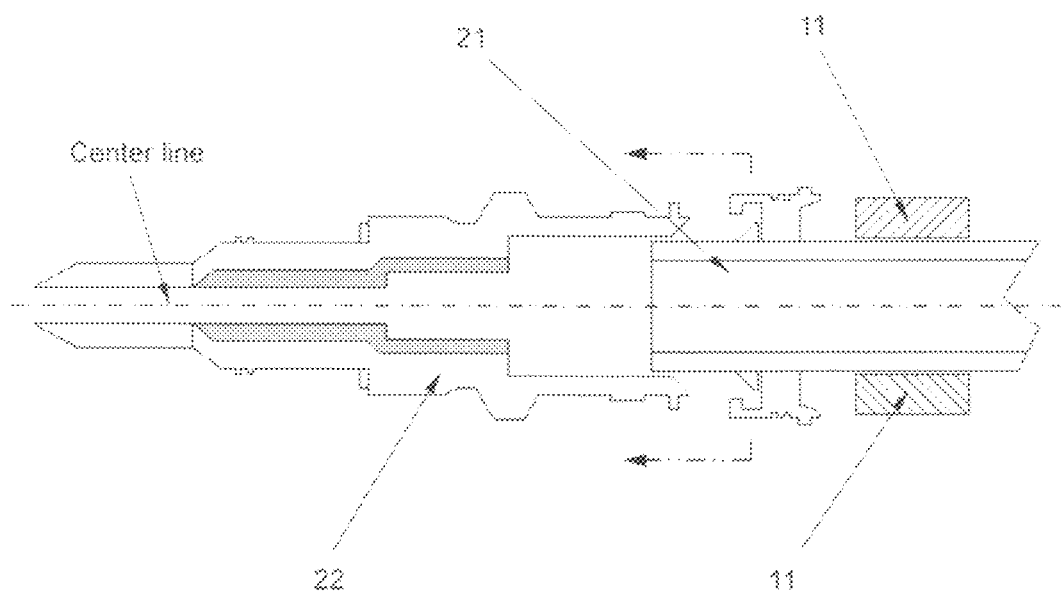
FIG. 2 shows a perspective view of another embodiment of the present invention with the ceramic composites being disposed on the exterior of a fuel line connecting to an accessory of the fuel systems of an engine.
Figure 3:
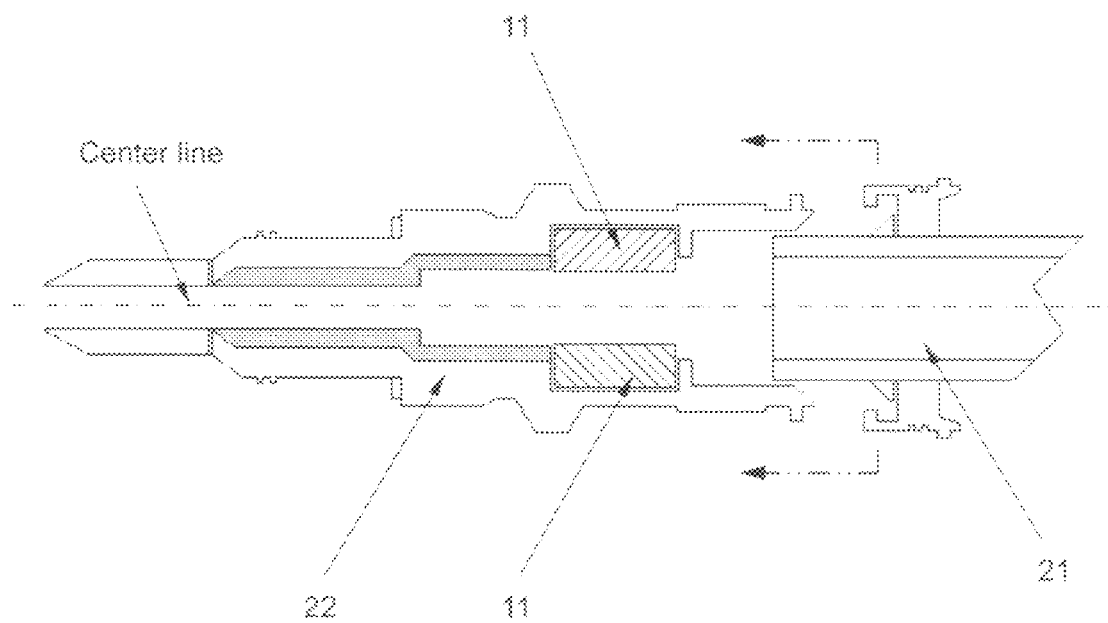

FIG. 1 shows a perspective view of a simple embodiment of the present invention, in which two pieces of infrared-emitting ceramic composites, 11, are mounted on a nonmetal fuel line, 21, of an engine. The two ceramic pieces may be secured to the fuel line with an attachment means, 31. In this case, it is simply a wrap tie. The ceramics of present invention can take any shapes, forms, styles, patterns, and in any thickness, though a partial-tubular shape is preferred for the ease of contouring to the fuel line. FIGS. 2 and 3 show a perspective view of another embodiment of the present invention that incorporates the ceramics as a part of an accessory in the fuel systems of engine. FIG. 2 shows the ceramics being mounted on the exterior of the fuel line that connects to said accessory. In contrast, FIG. 3 shows the ceramics being disposed inside the accessory, in direct contact with fuel. Said accessory of the fuel systems may be fuel tanks, pumps, lines, filters, injectors, or the like, that form the fuel path from fuel tank to engine and return. In other embodiments, the infrared emitting ceramics can be disposed in the interior of said accessory, embedded or coated on the inner wall, or being a part of said accessory.

The ceramics of the present invention can also be used in applications that use infrared in 3-20 μm wavelength range, such as therapeutic applications or water and drinks treatment.

EXAMPLES

Several ceramic samples of the present invention were designed and devised, specifically for demonstration in heavy-duty diesel engine applications. The samples contain, by weight, 20% silicate, 20% alumina, 24% zirconia, 4% sodium monoxide, 3% potassium oxide, 3% ferric oxide, 5% chromic oxide, 4% cobalt oxide, 2% all other minority oxides, and 15% pyroelectric material. Different samples that varied in weight percentages of the aforementioned ingredients were also made to tailor the specific spectral luminance.

Beta-Site Marine Diesel Engine Testing

The ceramic samples were tested by Motore MTU Italia s.r.l. (La Spezia, Italy) on its 8V4000M63 Model diesel engine in marine applications (rated max. power: 1000 kW@1800 RPM). Motore MTU's state-of-the-art testing facilities provide accurate and reliable measurement. During testing, $CO_2$ concentration in engine exhaust emissions was used as an indicator of fuel consumption, as it is nearly linearly proportional to the amount of fuel consumed in engine operation. To demonstrate the infrared-excitation effect on improvement of fuel economy, two fuel paths were implemented, one being regular fuel line as a "Baseline" configuration and the other having infrared-emitting ceramics surrounding the fuel hose as an "IR-excited" configuration. These two fuel lines were connected in parallel, with controlled valves at both ends. One end was connected to supply fuel line, while the other end to engine common rail for fuel injection. The valves could be switched instantly for selecting the fuel path between "Baseline" and "IR-excited". The engine was set to run at a constant speed of 1000 RPM and under a constant load at 1740 Newton torque. When the "Baseline" fuel path was selected, the $CO_2$ concentration was measured to be 5.4%. After it was switched to be "IR-excited", the $CO_2$ concentration was measured to be 4.8%, which indicates an about 12% drop in $CO_2$ concentration. It means that the ceramics of the present invention help reduce fuel consumption by about 12% for said engine operation.

Conclusion, Ramifications, And Scope

According to the present invention, a ceramic composite with amplified infrared-emissions comprises of a mixture of infrared-emitting metal oxides having specific spectral luminance in 3-20 μm wavelength range and an effective amount of pyroelectric material that helps enhance infrared emissions of said oxides in said wavelength range. Said ceramic composites can be devised to provide an effective means of improving hydrocarbon fuel efficiency in internal combustion engines for better engine performance with increased torque and power, improved fuel economy, and reduced exhaust emissions.

The invention has been described above. Obviously, numerous modifications and variations of the present invention are possible in light of the above teachings. Such variations are not to be regarded as a departure from the spirit and scope of the invention and all such modifications as would be obvious to one skilled in the art are intended to be included within the scope of the following claims.

I claim:

1. A ceramic composite for providing amplified infrared luminance in 3-20 micrometers wavelength range, said ceramic composite comprising of a mixture of infrared-emitting metal oxides having specific spectral luminance in said wavelength range and a pyroelectric material, said pyroelectric material being about 5-40% by weight, wherein as a result of the mixture being calcined at a temperature at or above 1200° C., said pyroelectric material is blended into and is an indistinguishable part of said composite for boosting infrared emissions in said wavelength range, thereby maximizing hydrocarbon fuel combustion efficiency in engines.

2. The ceramic composite according to claim 1, wherein said pyroelectric material comprises tourmaline.

3. The ceramic composite according to claim 1, wherein said pyroelectric material includes one or more polar crystal structures wherein each crystal structure has a pyroelectric class selected from the group consisting of 1, 2, m, mm2, 3, 3m, 4, 4mm, 6, and 6mm.

4. A The ceramic composite according to claim 1, wherein said pyroelectric material comprises one or more polar crystal structures selected from the group consisting of Halotrichite (2), Jarosite (3), and Alunite (3m) from complex sulfate system; Hemimorphite (mm2), Bertrandite (mm2), Schorl (3m), Cerite (3m), and Cancrinite (6) from silicate system; and Nepheline (6) from silica system.

5. A The ceramic composite according to claim 1, wherein said pyroelectric material is approximately 15- 25% by weight.

6. A method for producing a ceramic composite with amplified infrared luminance in 3-20 micrometers wavelength range, said method comprising mixing powders of infrared emitting metal oxides that have specific spectral luminance in said wavelength range with powders of pyroelectric material, said pyroelectric material being about 5-40% by weight, wherein as a result of the mixture being calcined at a temperature at or above 1200° C., said pyroelectric material is blended into and is an indistinguishable part of said composite for boosting infrared emissions in said wavelength range, thereby maximizing hydrocarbon fuel combustion efficiency in engines.

7. The method according to claim 6, wherein said pyroelectric material comprises tourmaline.

8. The method according to claim 6, wherein said pyroelectric material includes one or more polar crystal structures wherein each crystal structure has a pyroelectric class selected from the group consisting of 1, 2, m, mm2, 3, 3m, 4, 4mm, 6, and 6mm.

9. The method according to claim 6, wherein said pyroelectric material comprises one or more polar crystal structures selected from the group consisting of Halotrichite (2), Jarosite (3), and Alunite (3m) from complex sulfate system; Hemimorphite (mm2), Bertrandite (mm2), Schorl (3m), Cerite (3m), and Cancrinite (6) from silicate system; and Nepheline (6) from silica system.

10. The method according to claim 6, wherein said pyroelectric material is approximately 15- 25% by weight.

* * * * *